United States Patent Office 3,525,036
Patented Aug. 18, 1970

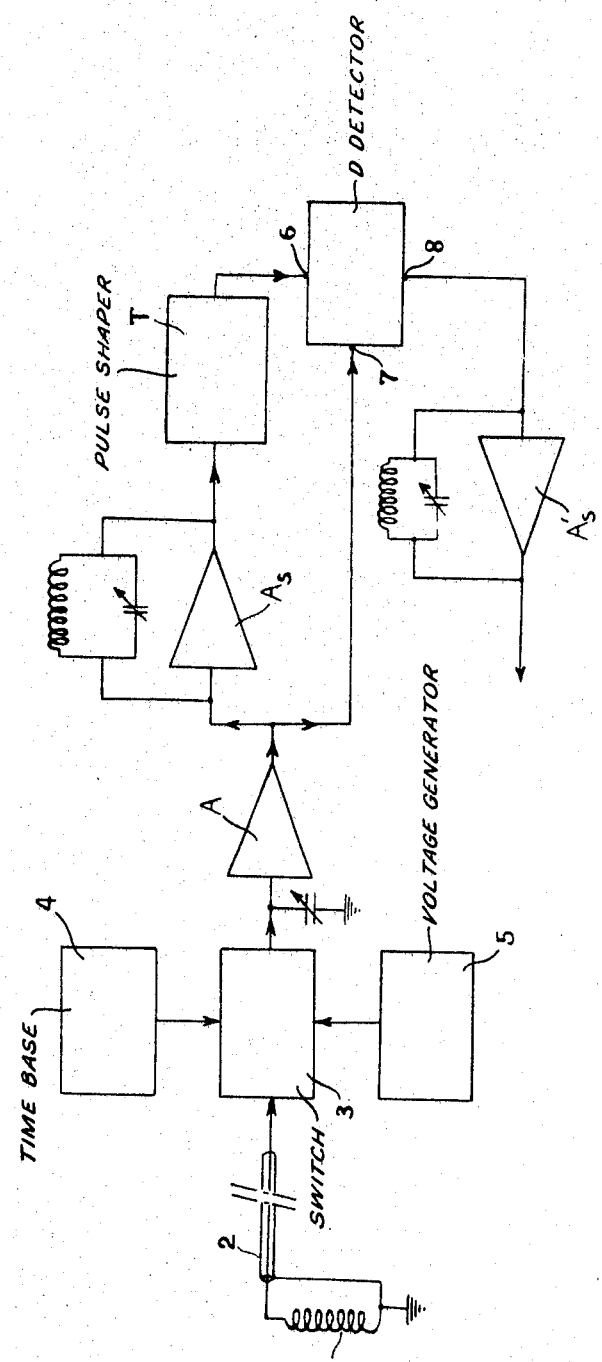

3,525,036
PROCESS FOR THE DETECTION OF HYDROCARBONS AND APPARATUS FOR CARRYING IT OUT
Georges Béné, Saint-Jeoire-Faucigny, France, assignor to Institut Francais du Petrole des Carburants et Lubrifiants, Rueil-Malmaison, Hauts-de-Seine, France
Filed Sept. 5, 1968, Ser. No. 757,712
Claims priority, application France, Sept. 15, 1967, 121,276
Int. Cl. G01n 27/78
U.S. Cl. 324—.5
2 Claims

ABSTRACT OF THE DISCLOSURE

Process based on the analysis of the free magnetic procession signal of the protons of the studied geological formation, this signal including a central peak at the frequency of the protons not bound to $C^{13}$ atoms and satellite peaks, wherein this signal is subjected to a synchronous detection with frequency change, using as a reference frequency the frequency of the central peak.

---

There is already known a process for the detection of hydrocarbons in geological formations, this process comprising the steps of subjecting the studied formations, which are placed in a permanent directing magnetic field, such as the earth's field, to a prepolarizing magnetic field having a direction different from that of the permanent field, then interrupting this prepolarizing field, thereby producing the free precession of the protons contained in said formations around said permanent magnetic field and receiving an electric signal induced by this free precession.

This process is characterized in that there are determined components of the signal thus obtained, the frequency of these components being selected from one at least of the two pairs of satellite frequencies $\nu \pm (62 \pm 3)$ Hertz and $\nu \pm (79 \pm 4)$ Hertz, wherein $\nu$ is a characteristic central frequency (frequency of precession of the protons not bound to the $C^{13}$ atoms, the value of which, expressed in Hertz, is substantially equal to 4257 times the number which expresses in Oersteds the value of the permanent magnetic field, and there is measured the intensity of at least one of said component, this intensity being representative of the ratio oil/water in the studied formations.

The above-mentioned process requires the detection in the received free precession signal of the satellite frequency lines due to the protons having a magnetic moment which are perturbated by the nuclei $C^{13}$.

These lines correspond to frequencies very near that of the central frequency line which corresponds to the free protons or protons not bound to $C^{13}$, thus making this detection very difficult. Moreover the amplitude of the satellite peaks is very small (generally on the order of $\frac{1}{200}$ that of the central peak), which results in a lack of precision in the measurement.

The present invention gives a solution to both these problems by a new application of the known method of synchronous detection with frequency change, to the free precession signal received in the process according to the above-mentioned process.

It is already known particularly for the detection of signals having a small amplitude, as compared with the noise level, to make the carrier wave of the signal to be detected interfere with a wave having a fixed frequency whose value is near that of the carrier wave (local oscillation or reference oscillation), so as to obtain a signal the amplitude of which is proportional to that of the signal to be detected and its frequency equal to the difference between those of the carrier wave and of the local oscillation.

Such a method of frequency changing permits the use of filters having a low pass band and therefor provides a better amplification of the signal to be detected together with a higher signal-to-noise ratio.

This method cannot however be used in this form for detecting the satellite peaks in free precession signal obtained according to the above-described process.

As a matter of fact the frequency of each of these peaks varies even at a fixed location, following the variations of the value of the earth's magnetic field at the considered location, as a function of time, and the difference between this frequency and the reference frequency of a local oscillator having a fixed frequency would consequently be subjected to the same variations. These frequency variations of the satellite peaks follow those of the frequency of the central peak, which is given by the formula $$\nu = 4257 H_o$$

($\nu$ expressed in Hertz and $H_o$, directing field for the free precession, generally the sole terrestrial magnetic field, expressed in Oersteds).

To isolate the satellite peaks from the output signal of the coil which detects the free precession, it would therefore be necessary to use either filters whose tuning frequency are adjusted as a function of the measured earth's field, or filters having a pass band which is wide enough to correspond to the fluctuations of the frequencies of the satellite peaks as a function of the variations of the earth's field, which would give a low precision in the measurement of the amplitudes of the satellite peaks, as a result of the small value of the signal-to-noise ratio.

According to the invention, there is provided a particular adaptation of the method of synchronous detection by frequency changing, to the analysis of the free precession signal which is obtained by the above-described process, so as to determine the amplitude of the satellite peaks located in the vicinity of a central peak, which corresponds to the magnetic resonance of the protons which are not bound to $C^{13}$ atoms. This adaptation consists in using as a reference oscillation, instead of a wave having a constant frequency, the signal corresponding to this central peak itself the frequency of which varies, like the one of the satellite peaks, in response to the fluctuations of the earth's magnetic field. The process of detection which is used is thus a particular synchronous detection.

The difference between the frequency of each satellite peak and the frequency of the central peak may be considered, at least in a first approximation, as independent from the value of the earth's magnetic field, when the latter varies within a small range, which is the case for the variations of this field at a given location (variation not exceeding a few thousandths of an Oersted).

The invention makes it therefor possible to be practically freed from the variations of this field thereby permitting to amplify the so-obtained signal of synchronous detection using a small pass band, the amplitude of this signal being a function of that of the so-isolated satellite peak (the pass band may be as narrow as allowed by the width of the considered satellite peak). Moreover the values of the intensities of the so-obtained signals may be stored in a recording device since these values do not depend on that of the earth's magnetic field at the instant of the different measurements.

According to the invention, there is isolated from the free precession signal, which is received by applying the above-described process, the component of this signal which has a frequency equal to the magnetic resonance frequency of the protons which are not bound to $C^{13}$ atoms, at the instant and at the location of reception of said precession signal, said component being used as a reference or local signal and being combined with the free precession signal so as to obtain a resulting signal by following the method of synchronous detection with frequency change, there is isolated from the resulting signal at least one of the components of this signal whose frequencies are equal to 62±3 Hertz and 79±4 Hertz and there is measured the amplitude of said component, this amplitude being representative of the hydrocarbon content of the studied geological formations.

An advantageous embodiment of the invention is described hereinunder, by way of example, with reference to the attached drawing.

In this figure, the reference numeral 1 designates the receiver coil of the sonde of a device for detecting the hydrocarbons according to the above-mentioned process.

The free precession signals received by this coil are transmitted through the cable 2 to the detection device according to the present invention.

This cable is connected with a switch 3 which is periodically actuated by a time base circuit 4 which successively and repetitively provides for the electric connection of this cable with an electric generator 5 applying to the coil 1 a prepolarization voltage which generates a prepolarization field $H_0$ in the studied geological formations, then the connection of the cable 1 with the device for detecting the received free precession signal, according to the present invention (alternance of phases of excitation of the geological formations by the coil 1 and of phases of reception of a free precession signal by the same coil).

From the output of the switch 3 the signal received by the coil 1 is directed to a low noise preamplifier A which is tuned to the average frequency of the satellite peak which is to be measured, with a sufficiently wide pass band (for example 10 Hz. to 2,000 Hz.) which permits to be practically freed of the possible variations of the earth's magnetic field.

The output signal from this amplifier is derived into two arms. One of these arms is connected with a selective amplifier $A_s$ tuned to the average resonance frequency of the protons which are not bound to $C^{13}$ atoms (protons bound to $C^{12}$ atoms and free protons), corresponding to the central peak of the spectrum of the free precession signal, for the average value of the earth's magnetic field at the location where the measurement is performed. This frequency will be close to 2,000 Hz. if the directing permanent field used for carrying out the process of detection of hydrocarbons through nuclear magnetic resonance as hereinabove described is the sole earth's magnetic field (no additional permanent magnetic field superposed to the earth's field).

The pass band of the selective amplifier $A_s$ will have to be sufficiently wide to accommodate the variations in the resonance frequency of the free protons as a function of the fluctuations of the earth's field at the location where the measurement is effected.

The frequency of the central peak is given by the already indicated formula $$\nu = 4257\ H_0$$

If the earth's magnetic field is used as the only directing permanent magnetic field and varies, for example, between the extreme values 0.470 Oersted and 0.471 Oersted at the considered location, the width of the pass band which will then be necessary will be of about 4 Hertz and if there is used an amplifier tuned to the frequency corresponding to the central peak, it will be easy to let this frequency pass while stopping the frequencies corresponding to the satellite peaks.

The signal leaving the selective amplifier $A_s$ passes through a shaping circuit T and the output signal of this circuit is used as the reference signal in a synchronous detector D which may be of a conventional type.

This signal is applied to the first output terminal 6 of this synchronous detector, while there is applied to the second input terminal 7 of this detector the signal leaving the preamplifier A (this output signal is thus derived into two arms: the selective amplifier $A_s$ and the synchronous detector D, as illustrated by the drawing).

The frequency band of the signal appearing at the output terminal 8 of the synchronous detector D results from the difference provided by D of the frequencies of the two signals respectively applied to the input terminals 6 and 7.

Thus the signal appearing at the terminal 8 comprises components the frequencies of which are equal to the respective differences between the frequencies of the different satellite peaks and that of the central peak.

These differences being substantially independent of the variations in the earth's magnetic field, when these variations are of limited amplitude (some thousandths to some hundredths of a Hertz), it results therefrom, and this is an essential advantage of the invention, that the two satellite peaks can be isolated from the output signal of the synchronous detector by means of a selective amplifier, such as $A_s$, the tuning frequency of which is adjusted once forever to either the two values 62±3 Hertz or 79±4 Hertz (according to the considered satellite peak), this amplifier having a pass band which can be as narrow as allowed by the width of the studied satellite peak (since there is no disturbance due to the earth's magnetic field), which permits to suppress the influence of the noise when measuring the value of the intensity of a satellite peak, the value of this itensity being representative of the hydrocarbon content of the studied geological formation.

What is claimed is:

1. A process for the detection of hydrocarbons in geological formations subjected to a directing permanent magnetic field, comprising the steps of subjecting said geological formations to a prepolarizing magnetic field having a direction different from that of said permanent field, then interrupting said prepolarizing field, thereby inducing the free precession of the protons contained in said formations around said permanent field, receiving an electric signal induced by said free precession, isolating from said signals the component thereof having a frequency equal to the resonance frequency of the protons which are not bound to $C^{13}$ atoms at the instant and at the place of reception of the free precession signal, combining said isolated component used as a local reference signal with said free precession signal, utilizing a process of synchronous detection so as to obtain a resulting signal having two components whose frequencies are substantially equal to 62±3 Hertz and 79±4 Hertz respectively, isolating from said resulting signal at least one of said components and measuring the amplitude of said component, this amplitude being representative of the hydrocarbon content of the studied geological formations.

2. Apparatus for the detection of hydrocarbons in geological formations subjected to a directing permanent magnetic field, including means for subjecting said formations to a prepolarizing magnetic field having a direction different from that of said permanent field, means for interrupting said prepolarizing field so as to induce the free precession of the protons contained in said formations around said permanent field, means for receiving an electric signal induced by said free precession, said signal including a central peak corresponding to the magnetic resonance of the protons not bound to $C^{13}$, and satellite peaks corresponding to the magnetic resonance of protons bound to $C^{13}$, said apparatus further including preamplifier means with a wide pass band to which is applied said signal and which is tuned to pass said satellite peaks and said central resonance peak, selective amplifier means which is tuned to the average frequency of said central peak at the location where the measurement is performed, a synchronous frequency changer detector having two input terminals, the signal leaving said selective amplifier means being applied to one of said two input terminals and serving as a reference local oscillation, the other input terminal of said detector means being connected to said preamplifier means, filter means being connected to the output of said synchronous detector means to isolate components from the resultant signal corresponding to at least one of the satellite peaks and means to measure the amplitude of isolated components.

References Cited

UNITED STATES PATENTS 3,439,260  4/1969  Bene _____ 324—.5

RUDOLPH V. ROLINEC, Primary Examiner

M. J. LYNCH, Assistant Examiner